United States Patent
Lee et al.

(10) Patent No.: US 9,509,417 B2
(45) Date of Patent: Nov. 29, 2016

(54) METHOD IN WHICH A TERMINAL TRANSCEIVES A SIGNAL IN A WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/346,685

(22) PCT Filed: Oct. 15, 2012

(86) PCT No.: PCT/KR2012/008381
§ 371 (c)(1),
(2) Date: Mar. 21, 2014

(87) PCT Pub. No.: WO2013/055178
PCT Pub. Date: Apr. 18, 2013

(65) Prior Publication Data
US 2014/0233518 A1 Aug. 21, 2014

Related U.S. Application Data

(60) Provisional application No. 61/547,021, filed on Oct. 13, 2011, provisional application No. 61/602,054, filed on Feb. 22, 2012, provisional application No. 61/620,976, filed on Apr. 5, 2012.

(51) Int. Cl.
*H04B 15/00* (2006.01)
*H04W 72/08* (2009.01)
*H04J 11/00* (2006.01)
*H04W 28/04* (2009.01)

(Continued)

(52) U.S. Cl.
CPC ............ *H04B 15/00* (2013.01); *H04J 11/005* (2013.01); *H04W 72/082* (2013.01); *H04B 7/024* (2013.01); *H04L 25/0226* (2013.01); *H04W 28/04* (2013.01)

(58) Field of Classification Search
None
See application file for complete search history.

(56) References Cited

U.S. PATENT DOCUMENTS

| | | | |
|---|---|---|---|
| 8,311,162 B2* | 11/2012 | Jongren | H04B 7/0854 375/267 |
| 9,271,167 B2* | 2/2016 | Song | H04W 24/02 |
| 2007/0025454 A1* | 2/2007 | Jones | H04J 11/0056 375/260 |

(Continued)

OTHER PUBLICATIONS

PCT International Application No. PCT/KR2012/008381, International Search Report dated Mar. 29, 2013, 14 pages.

(Continued)

*Primary Examiner* — Jeffrey M Rutkowski
*Assistant Examiner* — Jonathan B Wood
(74) *Attorney, Agent, or Firm* — Lee Hong Degerman Kang Waimey

(57) ABSTRACT

The present application relates to a method in which a terminal receives a signal in a wireless communication system. More particularly, the method comprises: a step of receiving, from a serving cell, interference mitigation information for mitigating interference from a neighboring cell; and a step of applying an interference mitigation technique based on the interference mitigation information so as to receive a signal from the serving cell. It is assumed that the serving cell does not apply said interference mitigation technique from after the reception of the interference mitigation information to the application of the interference mitigation technique.

12 Claims, 9 Drawing Sheets

(51) Int. Cl.
*H04B 7/02* (2006.01)
*H04L 25/02* (2006.01)

(56) References Cited

U.S. PATENT DOCUMENTS

| | | | |
|---|---|---|---|
| 2009/0252077 A1* | 10/2009 | Khandekar | H04W 72/082 370/312 |
| 2009/0274231 A1* | 11/2009 | Lee | H04L 5/00 375/260 |
| 2009/0323838 A1* | 12/2009 | Ho | H04L 5/0048 375/260 |
| 2010/0002800 A1* | 1/2010 | Kim | H04L 5/0037 375/295 |
| 2010/0008244 A1* | 1/2010 | Sampath | H04W 72/082 370/252 |
| 2010/0035555 A1* | 2/2010 | Bala | H04B 7/024 455/63.1 |
| 2010/0136994 A1* | 6/2010 | Kim | H04L 5/0035 455/450 |
| 2010/0172311 A1* | 7/2010 | Agrawal | H04L 5/0048 370/329 |
| 2010/0255852 A1* | 10/2010 | Chen | H04W 72/082 455/450 |
| 2010/0279619 A1* | 11/2010 | Yeh | H04B 7/024 455/63.1 |
| 2010/0309861 A1* | 12/2010 | Gorokhov | H04B 1/7103 370/329 |
| 2010/0317343 A1* | 12/2010 | Krishnamurthy | G01S 1/30 455/435.1 |
| 2011/0051650 A1* | 3/2011 | Winstok | H04W 4/08 370/312 |
| 2011/0051684 A1* | 3/2011 | Li | H04W 36/20 370/331 |
| 2011/0086663 A1* | 4/2011 | Gorokhov | H04W 52/325 455/522 |
| 2011/0110304 A1* | 5/2011 | Kuchi | H04L 5/0023 370/328 |
| 2011/0149894 A1* | 6/2011 | Luo | H04W 16/02 370/329 |
| 2011/0164549 A1* | 7/2011 | Huang | H04L 5/0053 370/312 |
| 2011/0194536 A1* | 8/2011 | Kim | H04L 5/0023 370/335 |
| 2011/0211560 A1* | 9/2011 | Yamamoto | H04W 36/20 370/332 |
| 2011/0228700 A1* | 9/2011 | Mildh | H04B 7/2606 370/254 |
| 2011/0243268 A1* | 10/2011 | Mashino | H04J 11/0066 375/285 |
| 2011/0267993 A1* | 11/2011 | Seo | H04B 7/2656 370/279 |
| 2012/0002591 A1* | 1/2012 | Noh | H04B 7/15557 370/315 |
| 2012/0008555 A1* | 1/2012 | Zhang | H04L 1/0606 370/328 |
| 2012/0014286 A1* | 1/2012 | Wang | H04L 27/2602 370/254 |
| 2012/0021753 A1* | 1/2012 | Damnjanovic | H04W 72/1289 455/450 |
| 2012/0034926 A1* | 2/2012 | Damnjanovic | H04B 7/022 455/450 |
| 2012/0069924 A1* | 3/2012 | Khojastepour | H04B 7/0486 375/267 |
| 2012/0076106 A1* | 3/2012 | Bhattad | H04L 5/0035 370/330 |
| 2012/0087250 A1* | 4/2012 | Song | H04W 24/04 370/242 |
| 2012/0087261 A1* | 4/2012 | Yoo | H04L 25/03 370/252 |
| 2012/0099547 A1* | 4/2012 | Wan | H04B 7/024 370/329 |
| 2012/0113844 A1* | 5/2012 | Krishnamurthy | H04L 1/0026 370/252 |
| 2012/0115521 A1* | 5/2012 | Tong | H04W 16/14 455/501 |
| 2012/0122472 A1* | 5/2012 | Krishnamurthy | H04L 5/0053 455/456.1 |
| 2012/0127910 A1* | 5/2012 | Li | H04B 7/155 370/312 |
| 2012/0127915 A1* | 5/2012 | Moberg | H04B 7/155 370/315 |
| 2012/0147809 A1* | 6/2012 | Takahashi | H04B 7/155 370/315 |
| 2012/0155362 A1* | 6/2012 | Montojo | H04W 72/082 370/312 |
| 2012/0201149 A1* | 8/2012 | Skarby | H04W 72/085 370/252 |
| 2012/0201188 A1* | 8/2012 | Ishii | H04L 5/0023 370/313 |
| 2012/0213092 A1* | 8/2012 | Sun | H04W 52/244 370/248 |
| 2012/0224499 A1* | 9/2012 | Yoo | H04J 11/005 370/252 |
| 2012/0252470 A1* | 10/2012 | Wong | H04W 72/048 455/450 |
| 2012/0258724 A1* | 10/2012 | Kim | H04W 72/082 455/452.2 |
| 2012/0281573 A1* | 11/2012 | Kazmi | H04W 8/26 370/252 |
| 2012/0329400 A1* | 12/2012 | Seo | H04J 11/005 455/63.1 |
| 2013/0044678 A1* | 2/2013 | Qu | H04W 52/244 370/328 |
| 2013/0044697 A1* | 2/2013 | Yoo | H04W 72/082 370/329 |
| 2013/0094456 A1* | 4/2013 | Ng | H04L 5/0091 370/329 |
| 2013/0128803 A1* | 5/2013 | Takahashi | H04L 1/1812 370/315 |
| 2013/0142074 A1* | 6/2013 | Tiwari | H04W 72/06 370/252 |
| 2013/0176981 A1* | 7/2013 | Earnshaw | H04L 1/02 370/329 |
| 2013/0182583 A1* | 7/2013 | Siomina | H04W 24/10 370/252 |
| 2013/0244678 A1* | 9/2013 | Damnjanovic | H04W 72/1289 455/452.1 |
| 2013/0322396 A1* | 12/2013 | Jiang | H04W 72/082 370/329 |
| 2014/0064133 A1* | 3/2014 | Kazmi | H04W 24/10 370/252 |
| 2014/0126483 A1* | 5/2014 | Novak | H04W 72/048 370/329 |
| 2014/0126530 A1* | 5/2014 | Siomina | H04W 52/146 370/330 |
| 2014/0198766 A1* | 7/2014 | Siomina | H04W 72/082 370/330 |
| 2014/0247810 A1* | 9/2014 | Bontu | H04W 36/0094 370/332 |
| 2014/0321406 A1* | 10/2014 | Marinier | H04B 7/024 370/329 |
| 2014/0348055 A1* | 11/2014 | Hoymann | H04B 7/15557 370/315 |

OTHER PUBLICATIONS

PCT International Application No. PCT/KR2012/008381, International Search Report dated Mar. 29, 2013, 11 pages.
LG Electronics, "Performance Evaluation for FeICIC", R1-113270, 3GPP TSG RAN WG1 Meeting #66bis, Oct. 2011, 14 pages.
NTT Docomo, "Summary of ad hoc session on FeICIC simulation assumptions", R1-112856, 3GPP TSG RAN WG1 Meeting #66, Aug. 2011, 2 pages.
LG Electronics, "Enhancement to Time-domain Resource Partitioning", R1-113273, 3GPP TSG RAN WG1 Meeting #66bis, Oct. 2011, 3 pages.

* cited by examiner

FIG. 2
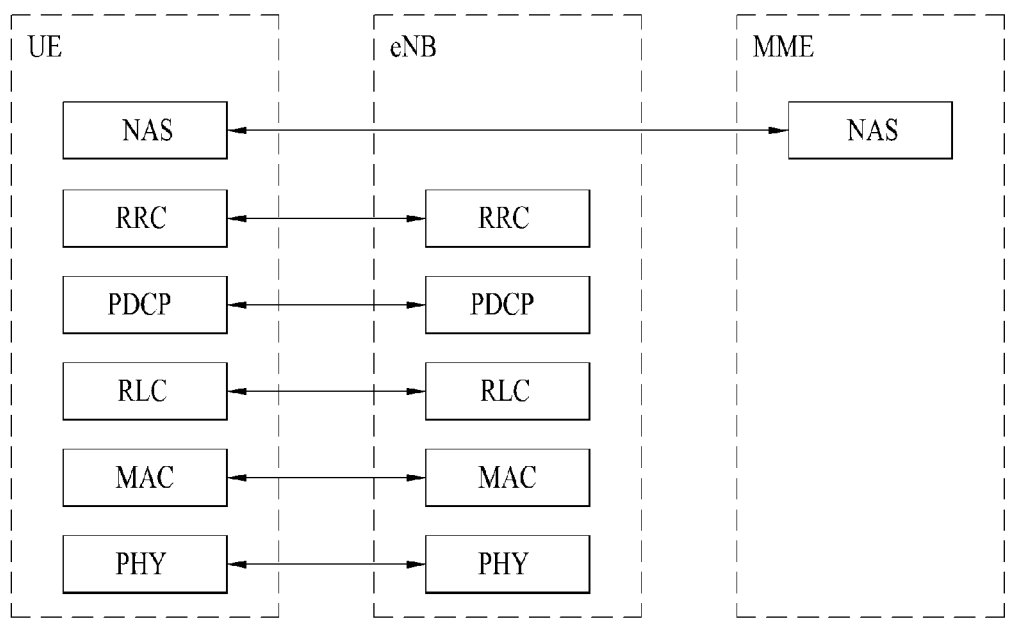
(a) Control-plane protocol stack
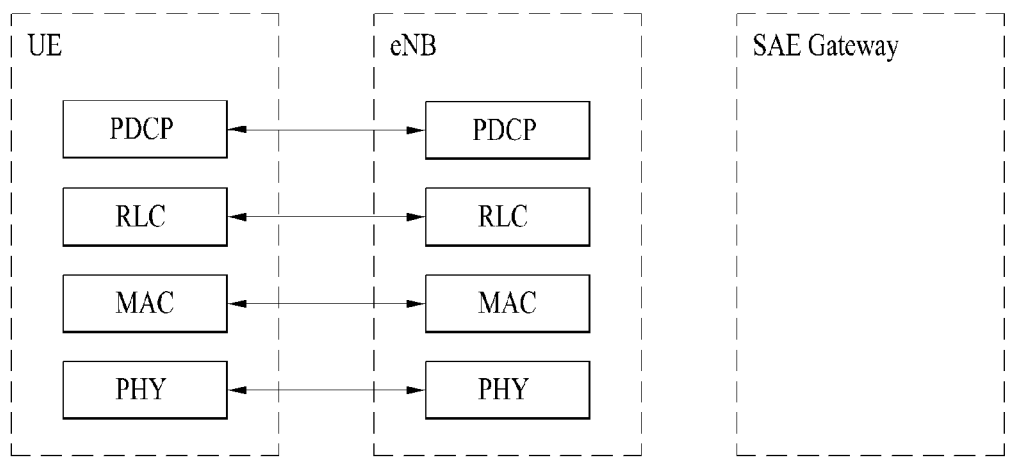
(b) User-plane protocol stack FIG. 7
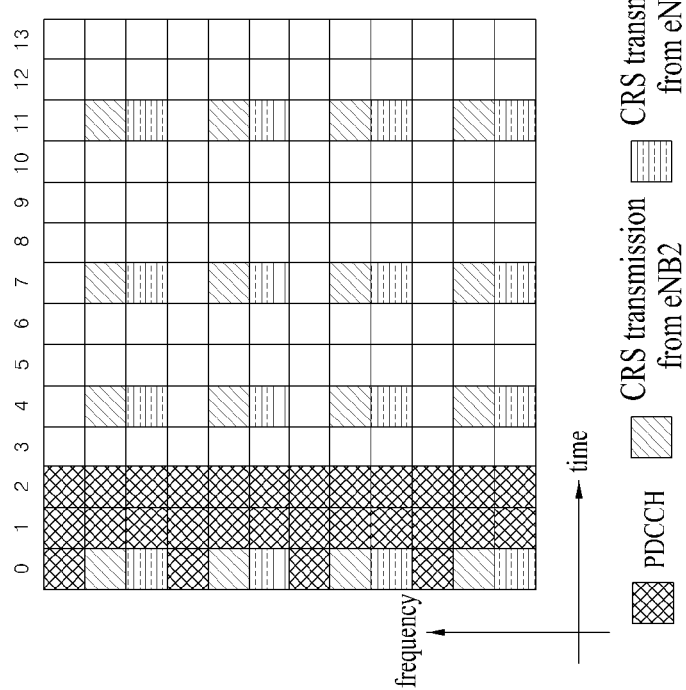
(a) eNB1 point of view
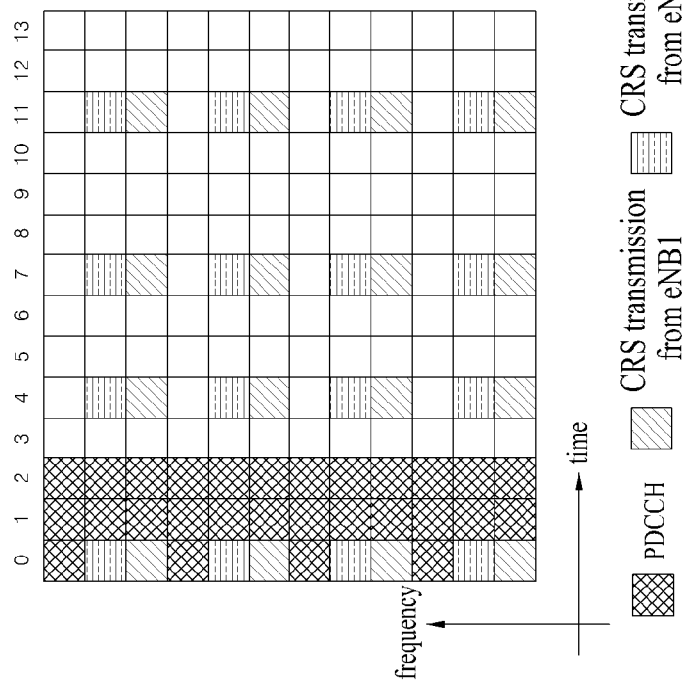
(b) eNB2 point of view

METHOD IN WHICH A TERMINAL TRANSCEIVES A SIGNAL IN A WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2012/008381, filed on Oct. 15, 2012, which claims the benefit of U.S. Provisional Application Ser. No. 61/547,021, filed on Oct. 13, 2011, 61/602,054, filed on Feb. 22, 2012, and 61/620,976, filed on Apr. 5, 2012, the contents of which are all hereby incorporated by reference herein in their entirety.

TECHNICAL FIELD

The present invention relates to a wireless communication system, and more particularly, to a method of transceiving a signal, which is transceived by a user equipment in a wireless communication system, and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Problem

Accordingly, the present invention intends to propose a method for a user equipment to transceive a signal in a wireless communication system and an apparatus therefor in the following description based on the discussion as mentioned in the foregoing description.

Technical Solution

To achieve these and other advantages and in accordance with the purpose of the present invention, as embodied and broadly described, according to one embodiment, a method of receiving a signal, which is received by a user equipment in a wireless communication system includes the steps of receiving interference mitigation information to mitigate interference from a neighboring cell from a serving cell and receiving a signal from the serving cell in a manner of applying an interference mitigating scheme based on the interference mitigation information, wherein it is assumed that the serving cell does not apply the interference mitigation scheme from the moment the interference mitigation information is received until the interference mitigation scheme is applied.

In this case, the method further includes the step of receiving a fallback mode-based downlink signal from the serving cell from the moment the interference mitigation information is received until the interference mitigation scheme is applied. Preferably, the fallback mode-based downlink signal is received by an SFBC (space-frequency block coding)-based transmit diversity scheme.

Moreover, the interference mitigation information is received via an RRC (radio resource control) layer signal and the interference mitigation information includes information on a cell-specific reference signal transmitted from the neighboring cell. More preferably, the information on the cell-specific reference signal corresponds to information on the number of antenna ports for the cell-specific reference signal transmitted from the neighboring cell.

To further achieve these and other advantages and in accordance with the purpose of the present invention, according to a different embodiment, a method of transmitting a signal, which is transmitted by a serving cell to a user equipment in a wireless communication system includes the steps of transmitting interference mitigation information to mitigate interference from a neighboring cell to the user equipment and transmitting a signal to the user equipment in a manner of applying an interference mitigating scheme based on the interference mitigation information, wherein the serving cell does not apply the interference mitigation scheme from the moment the interference mitigation information is transmitted until the user equipment receives a confirmation message for the application of the interference mitigation scheme.

In this case, the method further includes the step of transmitting a fallback mode-based downlink signal to the user equipment from the moment the interference mitigation information is transmitted until the user equipment receives a confirmation message for the application of the interference mitigation scheme. Preferably, the fallback mode-based downlink signal is transmitted by an SFBC (space-frequency block coding)-based transmit diversity scheme.

It is to be understood that both the foregoing general description and the following detailed description are exemplary and explanatory and are intended to provide further explanation of the invention as claimed.

Advantageous Effects

According to embodiments of the present invention, a user equipment can efficiently transceive a signal with an eNode B in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 7 is a diagram for an example that a mutual CRS works as interference in PDSCH region of each eNB in case that a cell identifier of an eNB1 and that of an eNB2 are different from each other in a situation depicted in FIG. 6;

BEST MODE

Mode for Invention

Figure 1:
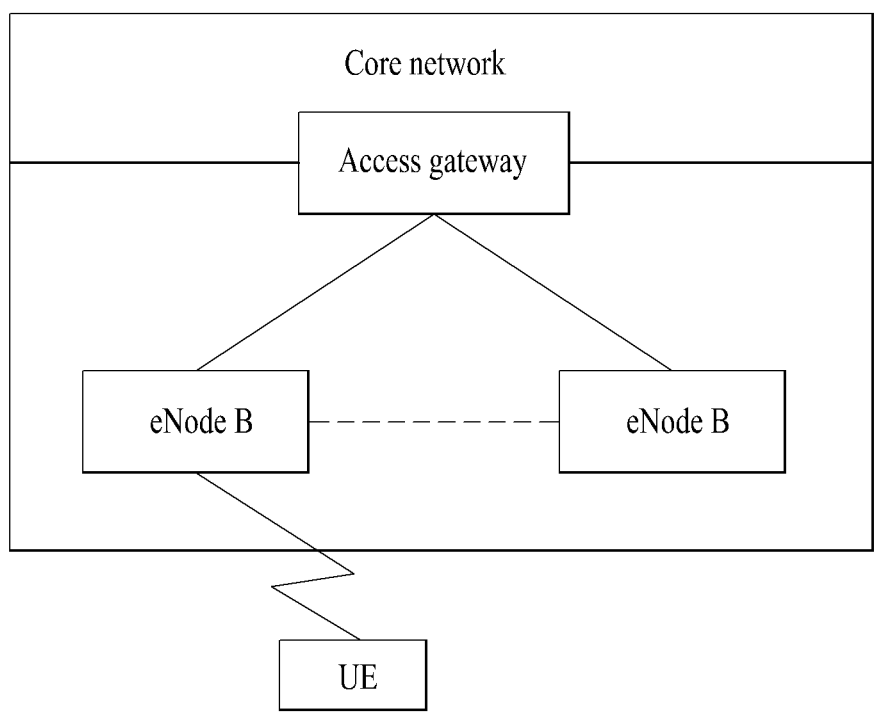
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description correspond to examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD (time division duplex) in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a first layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a second layer provides a service to a radio link control (hereinafter abbreviated RLC) layer, which is a higher layer, on a logical channel. The RLC layer of the second layer supports a reliable data transmission. The function of the RLC layer may be implemented by a function block within the MAC. PDCP (packet data convergence protocol) layer of the second layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a third layer is defined on a control plane only. The RRC layer is responsible for control of logical channels, transport channels and physical channels in association with a configuration, a re-configuration and a release of radio bearers (hereinafter abbreviated RBs). The RB indicates a service provided by the second layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
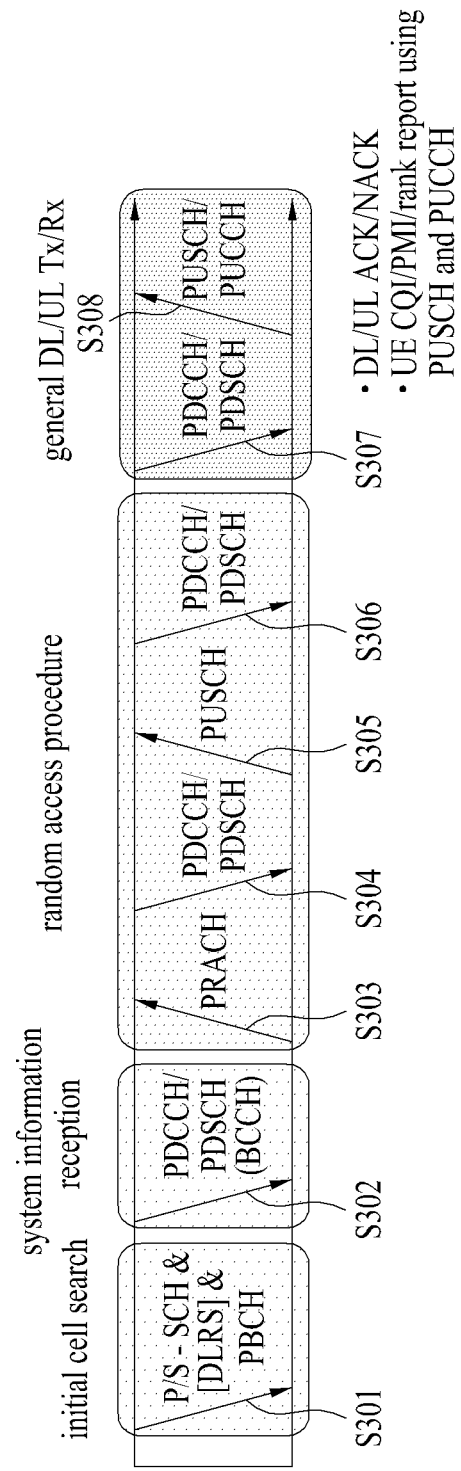
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303] and may be then able to receive a response message on PDCCH and the corresponding PDSCH in response to the preamble [S304]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI includes such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
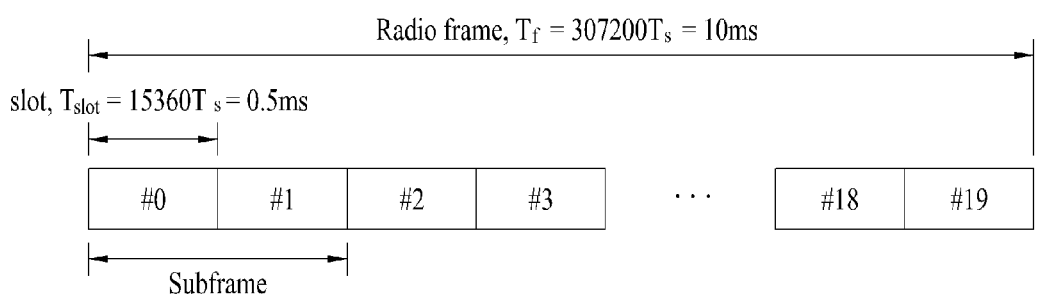
FIG. 4 is a diagram for an example of a structure of a radio frame in LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
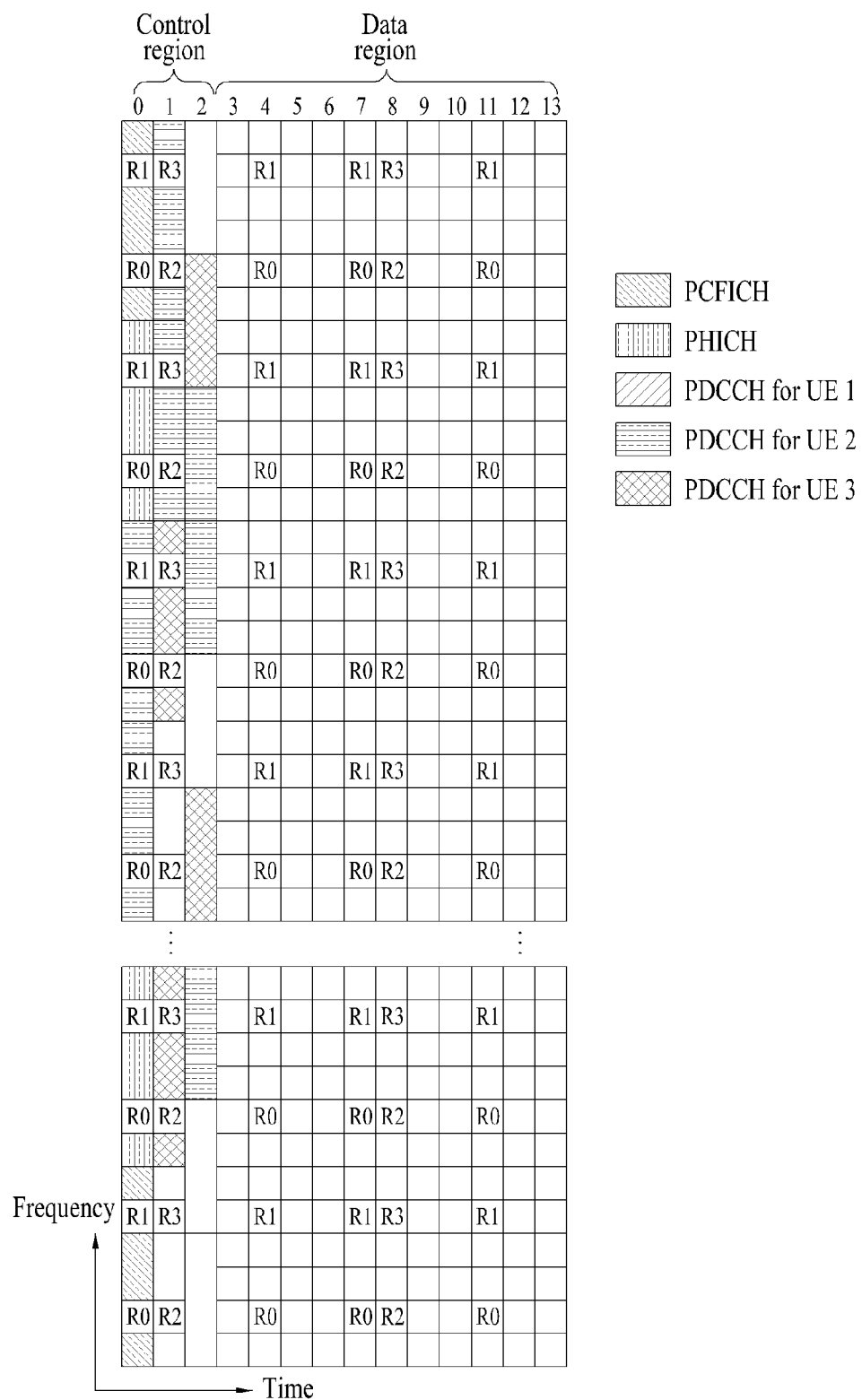
FIG. 5 is a diagram for an example of a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the drawing, R1 to R4 may indicate a reference signal (hereinafter abbreviated RS) or a pilot signal for antennas 0 to 3. The RS is fixed as a constant pattern in the subframe irrespective of the control region and the data region. The control channel is assigned to a resource to which the RS is not assigned thereto among the control region and a traffic channel is also assigned to a resource to which the RS is not assigned thereto among the data region. The control channel assigned to the control region may include a physical control format indicator channel (PCFICH), a physical hybrid-ARQ indicator channel (PHICH), a physical downlink control channel (PDCCH) and the like.

The physical control format indicator channel (PCFICH) informs a user equipment of the number of OFDM symbols used for the PDCCH in every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated by a QPSK (quadrature phase shift keying).

The physical hybrid-ARQ indicator channel (PHICH) is used for carrying HARQ ACK/NACK for an UL transmission. In particular, the PHICH indicates a channel in which DL ACK/NACK information for UL HARQ is transmitted.

The PHICH consists of a single REG and is scrambled cell-specifically. The ACK/NACK is indicated with 1 bit and is modulated by BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain on a frequency domain and/or a time domain.

The physical downlink control channel (PDCCH) is assigned to the first n OFDM symbol of a subframe. In this case, the n is an integer more than 1 and indicated by the PCFICH. The PDCCH consists of at least one CCE. The PDCCH informs each of user equipments or a user equipment group of information on resource allocation of a PCH (paging channel) and a DL-SCH (downlink-shared channel), which correspond to transport channels, an uplink scheduling grant, HARQ information and the like. The PCH (paging channel) and the DL-SCH (downlink-shared channel) are transmitted on the PDSCH. Hence, an eNode B and a user equipment transmit and receive data on the PDSCH in general except a specific control information or a specific service data.

Information for indicating prescribed user equipment (one or a plurality of user equipments) configured to receive data of the PDSCH, information for indicating a method of receiving/decoding the PDSCH data, and the like are transmitted in a manner of being included in the PDCCH. For instance, assume that a specific PDCCH is CRC masked with an RNTI (radio network temporary identity) called "A" and information on data transmitted using a radio resource (e.g., frequency position) called "B" and a transmission form information (e.g., a transport block size, a modulation scheme, coding information, and the like) called "C" is transmitted in a specific subframe. In this case, the user equipment within a cell monitors the PDCCH using the RNTI information of the user equipment. If there exist at least one or more user equipments having the "A" RNTI, the user equipments receive the PDCCH. And, the user equipments receives the PDSCH, which is indicated by the "B" and the "C", via the received information of the PDCCH.

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and an eNode B can perform a beamforming based on the channel state information to obtain a multiplexing gain of MIMO antenna. The eNode B transmits a reference signal to the user equipment to obtain channel state information from the user equipment and then commands the user equipment to feedback the channel state information measured based on the reference signal on Physical Uplink Control Channel (PUCCH) or Physical Uplink Shared Channel (PUSCH).

The CSI is mainly classified into an RI (rank indicator), a PMI (precoding matrix index), and a CQI (channel quality indication). First of all, as mentioned in the foregoing description, the RI indicates rank information of a channel and means the number of stream capable of being received by a user equipment via an identical frequency-time resource. And, since the RI is determined by a long term fading of a channel, the RI is feedback to an eNode B with a longer interval compared to the PMI and CQI value in general.

Secondly, the PMI is a value reflecting a spatial characteristic of a channel and indicates a UE's preferred precoding matrix index of an eNode B on the basis of such a metric as SINR, and the like. Lastly, the CQI is a value indicating strength of a channel and means a reception SINR capable of being received in case that an eNode B uses the PMI in general.

Meanwhile, it is expected that a LTE-A system, which is a standard of a next generation mobile communication system, will support a CoMP (coordinated multi point) transmission scheme, which is not supported by the conventional standard, to enhance a data transmission rate. In this case, the CoMP transmission scheme is a transmission scheme for two or more eNode Bs or cells to communicate with the user equipment in a manner of cooperating with each other to enhance a communication performance between the user equipment situated at a radio shadow zone and the eNode B (a cell or a sector).

The CoMP transmission scheme can be classified into a joint processing (CoMP-joint processing, CoMP-JP) scheme in the form of a cooperative MIMO via data sharing and a coordinated scheduling/beamforming (CoMP-coordinated scheduling/beamforming, CoMP-CS/CB) scheme.

According to the joint processing (CoMP-JP) scheme in case of DL, a user equipment may be able to instantaneously receive data simultaneously from each of the eNode Bs performing the CoMP transmission scheme. And, a reception performance can be enhanced in a manner of combining the signals received from each of the eNode Bs (Joint Transmission (JT)). And, it is also possible to consider a method of transmitting a data to the user equipment on a specific timing by one of the eNode Bs performing the CoMP transmission scheme (Dynamic Point Selection (DPS)). On the other hand, according to the coordinated scheduling/beamforming scheme (CoMP-CS/CB), the user equipment may be able to instantaneously receive data from a single eNode B, i.e., a serving eNode B, via a beamforming.

According to the joint processing (CoMP-JP) scheme in case of UL, each of the eNode Bs may be able to simultaneously receive PUSCH signal from the user equipment (Joint Reception (JR)). On the other hand, according to the coordinated scheduling/beamforming scheme (CoMP-CS/CB), only a single eNode B receives the PUSCH. In this case, whether to use the coordinated scheduling/beamforming scheme is determined by the coordinating cells (or eNode B).

Meanwhile, the CoMP scheme can be applied to heterogeneous networks as well as a same network consisting of macro eNBs only.

Meanwhile, as a method of mitigating inter-cell interference, an interfering cell may reduce transmit power of a part of physical channels or use an ABS (almost blank subframe) corresponding to a subframe not transmitted. And, an interfered cell may schedule a UE in consideration of the ABS.

In this case, from the point of view of the UE belonging to the interfered cell, interference level considerably changes depending on a subframe. Hence, in order to more precisely perform a radio link monitoring (RLM) operation in each subframe, perform a radio resource management (RRM) operation for measuring RSRP (reference signal received power), RSRQ (reference signal received quality), or the like, and measure the aforementioned CSI for link adaptation, the RLM, RRM, and the CSI measurement should be performed in a limited subframe set including a uniform interference characteristic.

In the following description, examples of a transmission mode are explained.

Current 3GPP LTE standard document, specifically, 3GPP TS 36.213 document defines DL transmission modes depicted in Table 1 and Table 2 as follows. The following transmission mode is set to a UE via an upper layer signaling, i.e., RRC signaling.

TABLE 1

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity Signaled MBSFN subframe with unicast allocation: Single-antenna port, port |
| | DCI format 2C | UE specific by C-RNTI | Up to 8 layer transmission, ports 7-14 |

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Transmit diversity |
| Mode 4 | DCI format 1A | Common and UE specific by C-RNTI | Transmit diversity |
| | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
| | DCI format 1 | UE specific by C-RNTI | Single-antenna port, port 5 |
| Mode 8 | DCI format 1A | Common and UE specific by C-RNTI | Single-antenna port, port 7 |
| | DCI format 2B | UE specific by C-RNTI | Single-antenna port, port 7 or 8 |

TABLE 2-continued

| Transmission mode | DCI format | Search Space | Transmission scheme of PDSCH corresponding to PDCCH |
|---|---|---|---|
| Mode 9 | DCI format 1A | Common and UE specific by C-RNTI | Single-antenna port, port 7 |
| | DCI format 2C | UE specific by C-RNTI | Single-antenna port, port 7 or 8 |

Current 3GPP LTE standard document includes DCI formats according to a type of RNTI masking PDCCH. In particular, in case of C-RNTI and SPS C-RNTI, the 3GPP LTE document shows a transmission mode and a DCI format corresponding to the transmission mode, i.e., a transmission mode-based DCI format. Moreover, the 3GPP LTE document also defines a DCI format 1 A capable of being applied irrespective of each transmission mode. Table 1 shows an example of a case that the type of RNTI masking PDCCH corresponds to the C-RNTI and Table 2 shows an example of a case that the type of RNTI masking PDCCH corresponds to the SPS C-RNTI.

For instance, if a DCI format 1B is detected as a result of performing blind decoding on the PDCCH masked with the C-RNTI in a UE-specific search area, PDSCH is decoded in a manner of assuming that PDSCH is transmitted by a closed-loop spatial multiplexing scheme using a single layer.

In case of applying various methods to efficiently mitigate inter-cell interference in an environment in which the inter-cell interference exists, the present invention proposes a method of efficiently supporting data communication of a UE. For clarity, the proposed method is explained on the basis of 3GPP LTE system in the following description. Yet, a scope of a system to which the proposed method is applied can be extended to a different system except 3GPP LTE system.

Figure 6:
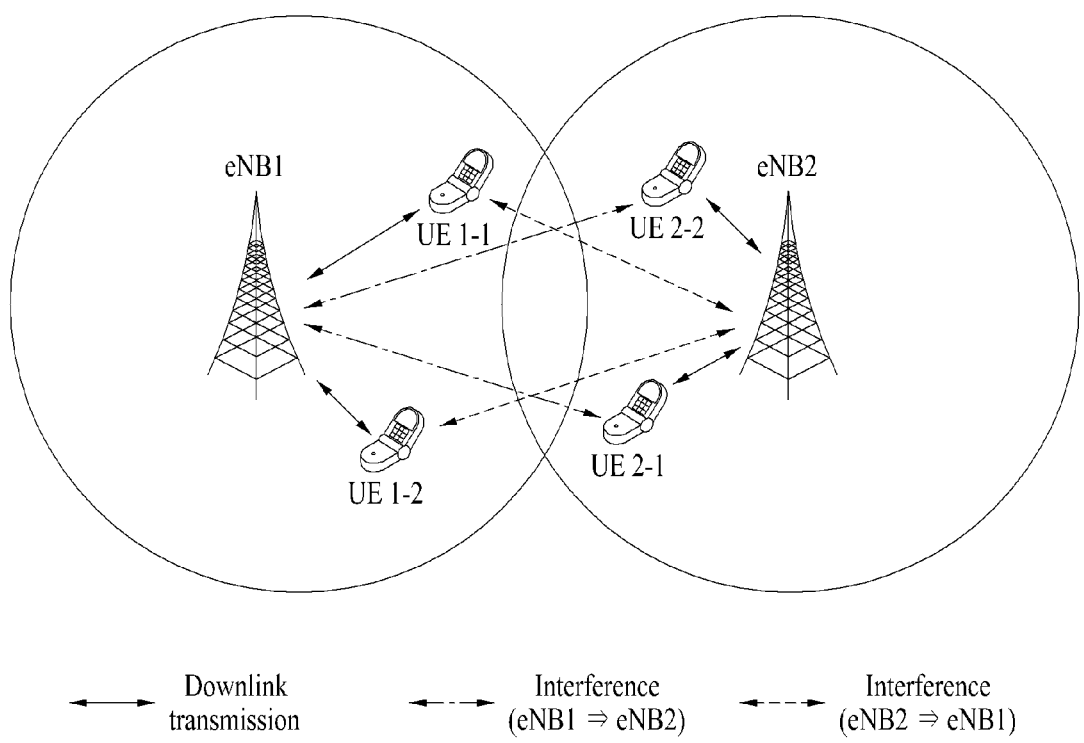
FIG. 6 is a diagram for an example that an eNB1 and an eNB2 are interfered with each other with their downlink communication in case that the eNB1 and the eNB2 perform the downlink communication with a UE of the eNB1 and a UE of the eNB2, respectively.

FIG. 6 is a diagram for an example that an eNB1 and an eNB2 are interfered with each other with their downlink communication in case that the eNB1 and the eNB2 perform the downlink communication with a UE of the eNB1 and a UE of the eNB2, respectively. In particular, assume that the eNB1 and the eNB2 perform the downlink communication using a co-channel in FIG. 6.

FIG. 7 is a diagram for an example that a mutual CRS works as interference in PDSCH region of each eNB in case that a cell identifier of an eNB1 and that of an eNB2 are different from each other in a situation depicted in FIG. 6. In particular, assume that each of the eNB1 and the eNB2 has 2×2 antenna configuration (i.e., two antenna ports).

Referring to FIG. 7, since a $V_{shift}$ value, which corresponds to a frequency shift factor of a CRS, is defined by a cell identifier, if a cell identifier of the eNB1 and a cell identifier of the eNB2 are different from each other, it is able to know that each CRS transmitted from the eNB1 and the eNB2, respectively, is mapped to subcarriers different from each other.

As depicted in FIG. 7, if interference occurred by a CRS of a neighboring cell (i.e., N-eNB) entering a PDSCH region is considerable, a UE cannot properly decode a DL signal transmitted from a serving eNB (i.e., S-eNB) of the UE. Hence, it is necessary to consider an additional method to mitigate interference from the N-eNB(s).

For instance, as a first method, there is a transmitting side RM method corresponding to a method for the S-eNB to transmit DL data to remaining regions (i.e., resource elements to which the DL data can be mapped) except resource elements (REs) where interference is received from the N-eNB(s) in a manner of performing a rate matching with the DL data. In this case, the eNB can inform a UE of information on whether the transmitting side RM method is applied and/or information (e.g., a type of a reference signal (of a neighboring cell) to which the transmitting side RM method is applied, antenna port configuration information, information on a position of a (time/frequency) resource) on a resource to which the transmitting side RM method is applied and the like via a predefined signaling (e.g., a physical layer or an upper layer signal).

As a second method, there is a receiving side puncturing method corresponding to a method for a UE of the S-eNB to decode a received DL data using remaining resource elements only except resource elements where interference is received from the N-eNB while the S-eNB normally transmits the DL data to the UE of the S-eNB. In this case, the eNB can inform the UE of information on whether the receiving side puncturing method is applied and/or information (e.g., a type of a reference signal (of a neighboring cell) to which the receiving side puncturing method is applied, antenna port configuration information, information on a position of a (time/frequency) resource) on a resource to which the receiving side puncturing method is applied and the like via a predefined signal (e.g., a physical layer or an upper layer signal).

Lastly, as a third method, there is a receiving side interference invalidating method corresponding to a method for the UE of the S-eNB to decode DL data transmitted from the S-eNB by performing an operation of invalidating interference from the N-eNBs while the S-eNB normally transmits the DL data to the UE of the S-eNB. In this case, the eNB can inform the UE of information on whether the receiving side interference invalidating method is applied and/or information (e.g., a type of a reference signal (of a neighboring cell) to which the receiving side interference invalidating method is applied, antenna port configuration information, information on a position of a (time/frequency) resource) on a resource to which the receiving side interference invalidating method is applied and the like via a predefined signal (e.g., a physical layer or an upper layer signal).

For clarity, various methods used for mitigating interference from the N-eNBs are commonly called interference mitigation (IM) scheme in the following description. And, for clarity of explanation, an eNB giving interference is called an interfering cell and an eNB receiving interference is called an interfered cell in the following description.

First Embodiment

In case that the S-eNB informs a UE of information on whether the IM scheme is applied via an RRC signaling in an environment in which interference from the N-eNB(s) exists, the S-eNB cannot exactly know when the UE applies the IM scheme based on RRC information. In this case, it may perform a predetermined fallback mode (e.g., DCI format 1A) based-PDSCH transmission. Or, a rule can be determined in advance in order to perform a fallback mode to which a predetermined specific IM scheme is applied or a specific transmission mode based-PDSCH transmission.

The eNB can inform the UE of corresponding information in advance via an upper layer or a physical layer signaling.

Hence, the present invention proposes that the IM scheme is not always applied in order not to be affected by the RRC signaling when the fallback mode based-PDSCH transmission is performed. By performing the proposed scheme, ambiguity of an operation of a UE or an eNB can be eliminated.

For instance, in case that both of the eNB1 and the eNB2 perform a CoMP operation in the situation depicted in FIG. 6, assume that the eNB1 transmits DL information to a UE1 with a transmission mode (TM) 9. In this case, the transmission mode 9 is one of DL transmission modes defined in LTE system and a DL signal is transmitted using a UE-specific reference signal used for transmitting maximum 8 layers. According to the transmission mode 9, it is defined that an antenna port uses 7 to 14.

And, assume that the eNB1 uses the transmitting side RM method among the aforementioned IM schemes to mitigate CRS interference received from the eNB2, receives information on MBSFN (multimedia broadcast multicast service single frequency network) subframe configuration of the eNB2 via an X2 interface, and informs the UE of the information again.

In this case, since the eNB1 knows that CRS interference does not come into a PDSCH region of the eNB1 in subframes in which the eNB2 operates as the MBSFN, the eNB1 performs a normal DL transmission based on the TM 9 instead of applying the transmitting side RM method. In this case, since the UE has received the information on the MBSFN subframe configuration of the eNB2 from the eNB1, the UE knows that normal DL information is transmitted based on the TM 9 in the corresponding subframes.

On the contrary, since the CRS interference comes into PDSCH region of the eNB1 in the subframes where the eNB2 does not operate as the MBSFN, the eNB1 transmits DL information to the UE1 in a manner of applying the transmitting side RM method. In this case, since the UE knows that the eNB2 does not operate as the MBSFN in the corresponding subframes, the UE also knows that the eNB1 will perform the DL information transmission to which the transmitting side RM method is applied.

Hence, the UE1 can normally receive the DL information from the eNB1 without the CRS interference of the eNB2 based on the aforementioned operation. Yet, if an impact of the CRS interference coming from the eNB2 becomes trivial due to a movement of the eNB1 and then there is no reason for the eNB1 and the eNB2 to perform the CoMP operation, it is not necessary for the UE1 to receive the transmitting side RM method-based DL information from the eNB1 anymore.

Figure 8:
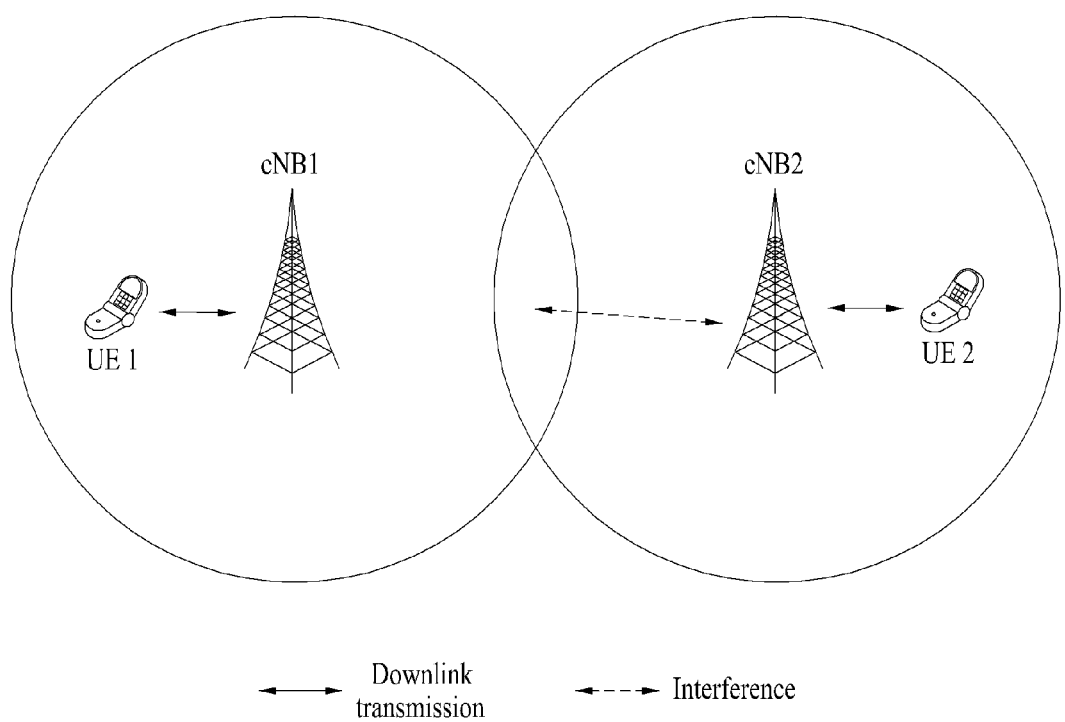
FIG. 8 is a diagram for an example that CRS interference is reduced according to a movement of a UE1 in a situation depicted in FIG. 6.

FIG. 8 is a diagram for an example that CRS interference is reduced according to a movement of a UE1 in a situation depicted in FIG. 6. Referring to FIG. 8, an impact of the CRS interference coming from the eNB2 becomes trivial as the UE1 moves and it is able to know that it is not necessary for the eNB1 and the eNB2 to perform CoMP operation. In particular, application of the transmitting side RM method can be stopped.

In this case, the eNB1 can inform the UE of information on the above-mentioned situation (i.e., stop applying the transmitting side RM method) via an RRC signaling. Yet, the eNB1 cannot precisely know when the UE properly operates based on the received RRC information. In this case, a predetermined fallback mode-based PDSCH transmission (e.g., PDSCH transmission based on the DCI format 1A) can be performed. In case of performing the fallback mode-based PDSCH transmission, ambiguity (or impact of the RRC signaling) of operation performed by the UE or the eNB can be eliminated by regulating the IM scheme not to be always applied.

In addition, the fallback mode is defined to operate based on the DCI format 1A in LTE system and DCI format 1A-based PDSCH is transmitted by using a transmit diversity scheme, more specifically, an SFBC (space-frequency block coding) scheme. In case of applying the SFBC scheme, information is mapped in a unit of two RE pairs and this is called SFBC pairing.

In this case, if a transmitting side rate matching (RM) scheme is applied when the fallback mode-based PDSCH is transmitted, it may not secure a normal operation of the SFBC scheme. In this case, this sort of problem can be efficiently resolved by regulating the IM scheme not to be always applied when the fallback mode-based PDSCH is transmitted.

As a different method, when the fallback mode-based PDSCH is transmitted, it may assume that the IM scheme is always applied for a CRS pattern of maximum number of antenna ports from an interfering cell to avoid an impact of an RRC signaling (e.g., IM scheme change). In this case, the CRS pattern of maximum number of antenna ports from the interfering cell may be affected by the number of antenna ports and a value of the CRS pattern can be determined by the number of interfering cells, the number of antenna ports of each interfering cell, and the like. As an example, the S-eNB may inform the UE of the CRS pattern of maximum number of antenna ports from the interfering cell in advance via signaling (e.g., upper layer signaling or physical layer signaling).

And, from the S-eNB point of view, it may configure the fallback mode-based PDSCH not to be mapped on a symbol to which a CRS is transmitted or a symbol to which the CRS can be transmitted. In this case, the aforementioned operation may be matched with an operation of LTE system in terms of the SFBC pairing for example.

Or, it may configure the fallback mode-based PDSCH not to be mapped on a symbol (or a symbol to which a CRS of an interfering cell is or can be transmitted based on the CRS pattern of the number of maximum antenna ports) to which a CRS of an interfering cell is or can be transmitted. The S-eNB may inform the UE of information on application of the aforementioned operation in advance via signaling (e.g., upper layer signaling or physical layer signaling).

In the present invention, an assumption that a specific interference mitigation scheme is (always) applied may mean that meaningful information is not mapped (e.g., rate matched RE) to a part of resource elements (REs) or a specific region (e.g., RB or REG unit) to which corresponding information is transmitted depending on a type (e.g., transmitting side RM method) of interference mitigation scheme that is applied. In this case, the region to which the meaningful information is not mapped can be determined according to a CRS antenna port configuration of an interfering cell, which is informed by the eNB to the UE via an RRC signaling or a physical layer signaling.

As a further different method, if the UE receives a predefined specific channel (e.g., PBCH or SIB) irrespective of a type of an interference mitigation scheme configured (e.g., activated or inactivated) in a system, it may assume that the meaningful information is not mapped (e.g., rate matched RE) to a position or a region corresponding to the CRS antenna configuration of the interfering cell delivered from the eNB.

The present invention can be extensively applied in a situation to which a specific interference mitigation scheme is applied as well as a situation in which the fallback mode is operated.

Second Embodiment

Such a terminology as (e)PBCH ((enhanced) physical broadcast block), (e)SIB, (e)PDCCH, and the like used in the following description indicates a control channel transmitted in a PDSCH region not based on a legacy CRS but based on a (predetermined specific antenna port-based) DM-RS (or CSI-RS). Information on antenna port configuration used for decoding the eSIB or the ePDCCH can be (individually) transmitted on the ePBCH (or legacy SIB or PBCH).

When a UE receives the (e)PBCH or the (e)SIB from the S-eNB, it may assume that a specific interference mitigation scheme is always applied based on the CRS antenna configuration information of the interfering cell received in advance via the upper layer signaling or the physical layer signaling or information on the specific interference mitigation scheme applied to the interfering cell.

As an example, the CRS antenna configuration information of the interfering cell informed by the S-eNB to the UE can be actually configured by a configuration identical to a CRS antenna configuration (e.g., 1/2/4 Tx antenna ports) used by the interfering cell. As a different example, if a specific interference mitigation scheme (e.g., transmitting side RM method) is applied, the S-eNB may inform the UE of a CRS antenna configuration including relatively less number of antennas compared to the actual CRS antenna configuration of the interfering cell in consideration of a phenomenon that overhead of a RE (e.g., rate matched RE) not used to mitigate the CRS interference of the interfering cell becomes relatively higher. This may be called a fake or virtual CRS antenna configuration.

As a further different method, the UE may receive the (e)PBCH or the (e)SIB from the S-eNB in an assumption that maximum (interfering cell) CRS pattern is always applied to the interference mitigation scheme. In this case, the maximum (interfering cell) CRS pattern may be affected by the number of antenna ports and a value of the maximum (interfering cell) CRS pattern can be determined by the number of interfering cells, antenna configuration of the interfering cell(s), and the like. As an example, the S-eNB may inform the UE of the maximum (interfering cell) CRS pattern in advance via signaling (e.g., upper layer signaling or physical layer signaling).

Additionally, in case that the specific interference mitigation scheme (e.g., transmitting side RM method) is applied, a method for the UE to always assume the maximum (interfering cell) CRS pattern may mean that overhead of a RE (e.g., rate matched RE) not used to mitigate the CRS interference of the interfering cell becomes relatively higher.

Hence, the S-eNB informs the UE of specific (fixed) (interfering cell) CRS pattern information and may make the UE selectively (or autonomously) apply a predefined interference mitigation scheme (e.g., receiving side puncturing method, receiving side interference invalidating method) to interference received by a CRS pattern of a remaining interfering cell.

For instance, the S-eNB informs the UE of 2 antenna ports (e.g., CRS antenna port #0 antenna port #1)-based (interfering cell) CRS pattern to which a specific interference mitigation scheme (e.g., transmitting side RM method) is always applied and may be then able to additionally make the UE spontaneously apply a (predefined) receiving side interference invalidating method (or a receiving side puncturing method) to interference occurred due to the CRS pattern of the remaining interfering cell. In this case, the eNB may inform the UE of an interference threshold to which the predefined interference mitigation scheme is applied via the upper layer signaling or the physical layer signaling.

Third Embodiment

The aforementioned proposed schemes can be extensively applied to a case that a specific UE makes a handover to the N-eNB from the S-eNB of the specific UE. For instance, the UE (implicitly) assumes the number of CRS antenna ports (or CRS antenna port number) of the S-eNB based on a DL communication lastly performed with the S-eNB of the UE or a maximum CRS pattern of the S-eNB and may be then able to utilize the aforementioned information for a (predefined) interference mitigation scheme, which is used for a case that (e)PBCH or (e)SIB is received from the N-eNB. In particular, this sort of method is efficient when the interference from the S-eNB is eliminated using the receiving side puncturing method or the receiving side interference invalidating method.

And, the S-eNB may directly inform the UE of information (e.g., CRS pattern information) on CRS interference from the S-eNB occurred in case of receiving the (e)PBCH or the (e)SIB from the N-eNB in advance via an RRC signaling (e.g., in a manner of being included in a handover message). In addition, the aforementioned proposed scheme can be extensively applied to a case that a mobile relay makes a handover to a different neighboring cell from a specific cell in a 'UE operation mode' or 'relay operation mode'.

Additionally, when the S-eNB transmits the (e)PBCH or the (e)SIB to the UE, it may configure (meaningful) information for the corresponding channel not to be mapped (e.g., rate matched symbol) in a symbol to which a CRS is or can be transmitted in terms of the S-eNB. In this case, it is advantageous that the aforementioned operation may be matched with an operation of LTE system in terms of the SFBC (RE) pairing or the aforementioned operation can avoid from the impact of the CRS pattern interference of the interfering cell. The eNB may inform the UE of the application of the operation scheme via the RRC signaling (or physical layer signaling).

As a different scheme, when the S-eNB transmits the (e)PBCH or the (e)SIB to the UE, it may configure meaningful information for the corresponding channel not to be mapped (e.g., rate matched symbol) in a symbol to which a CRS of an interfering cell is or can be transmitted (or a symbol to which a CRS is or can be transmitted based on a maximum CRS pattern of the aforementioned (informed by the eNB to the UE) interfering cell). Similarly, the eNB may inform the UE of the application of the operation scheme via the RRC signaling (or physical layer signaling).

As a further different scheme, the eNB may make the UE perform a blind decoding (BD) on a rate matching (RM) pattern (e.g., rate matched RE or a rate matched symbol), which is applied to the (e)PBCH ((e)MIB)) or the (e)SIB, in a CRS RE or a CRS symbol (position). In this case, the eNB may inform the UE of information on whether the aforementioned operation is applied via upper layer signaling or physical layer signaling. The aforementioned scheme can be extensively applied to all situations that the UE receives the (e)PBCH ((e)MIB) and the (e)SIB from the S-eNB or the N-eNB.

The aforementioned proposed schemes can be applied in order to receive the (e)PBCH or the (e)SIB in case of performing an initial access (or a non-initial access and UL timing synchronization) operation to a specific cell based on (e)PDCCH where a common search space (CSS) is implemented in a specific resource (e.g., PDSCH) region in advance.

Fourth Embodiment

Meanwhile, if strong interference from a CRS of an interfering cell is received, an interfered cell may not use a corresponding OFDM symbol to transmit (or map) PDSCH. In this case, if the interfered cell cannot identify precise information on a CRS pattern of the interfering cell, the interfered cell assumes the CRS pattern of the interfering cell based on the number of CRS antenna ports or the maximum number of CRS antenna ports which is configured in advance for the aforementioned case and may be then able to configure the OFDM symbol not used for the PDSCH transmission of the interfered cell.

And, the interfering cell may not transmit (or map) the PDSCH on the OFDM symbol carrying the CRS of the interfering cell to reduce interference to the interfered cell. In this case, the aforementioned operation can be efficiently used for a case that the interfering cell has configured a reduced power ABS for an inter-cell interference mitigation operation.

Moreover, in a situation that the interfering cell has configured the reduced power ABS, the aforementioned operation can be efficiently used for a case that there exist a limitation (e.g., a threshold value of transmit power of a PDSCH transmitting RE capable of being reduced in contrast to the transmit power of a CRS transmitting RE on a symbol carrying the CRS) for a transmit power ratio configuration between the CRS transmitting RE and the PDSCH transmitting RE on the symbol carrying the CRS.

The aforementioned proposed schemes may be used to efficiently perform an SFBC pairing operation for a case that the interfered cell cannot identify precise information on the CRS pattern of the interfering cell or a case that the interfered cell performs a rate matching operation or a puncturing operation for a CRS interference RE of the interfering cell. And, the aforementioned proposed schemes can also be extensively applied in case that the number of configured CRS antenna ports of the interfered cell is different from the number of configured CRS antenna ports of the interfering cell. According to the aforementioned proposed schemes, a PDSCH transmission (or mapping) can be normally performed on remaining OFDM symbols except the OFDM symbols to which the PDSCH is not transmitted. An eNB (the interfered cell or the interfering cell) can inform UEs of the eNB of information on whether the proposed scheme is applied or information on the OFDM symbol where the PDSCH transmission (or mapping) is not performed via an upper layer signal or a physical layer signal.

As an additional method, the interfering cell may not perform the PDSCH transmission (or mapping) on an OFDM symbol to which the CRS of the interfering cell is transmitted in a predetermined resource (e.g., position of predetermined specific subframes) of time domain only. In the same manner, if the interfered cell does not use an OFDM symbol in which the CRS interference from the interfering cell exists for the use of transmitting PDSCH of the interfered cell, it may also limit to a predetermined resource of time domain. In this case, the interfering cell or the interfered cell may inform UEs of the interfering cell or UEs of the interfered cell of information on the time domain resource in which OFDM symbols where the PDSCH is not transmitted exist in advance via an upper layer signal or a physical layer signal.

And, in order to support an operation of efficiently mitigating inter-cell interference, the information (or information on time domain resource, which is configured not to transmit PDSCH on an OFDM symbol where CRS interference from a neighboring cell exists) on the time domain resource, which is configured not to transmit PDSCH on an OFDM symbol to which a CRS is transmitted between cells, can be shared via a x2 interface or a predetermined radio resource channel.

The aforementioned proposed scheme can be extensively applied to all environments in which interference coming from the N-eNB(s) exists. And, the proposed scheme can also be extensively applied to an environment (e.g., a case that interference exists between intra-bands, a case of using an extension carrier) to which a carrier aggregation (CA) scheme is applied. The aforementioned proposed schemes can be extensively applied to a communication situation between 'eNB and RN', 'RN and UE', 'UE and UE (D2D)' as well as a communication situation between the eNB and the UE. Moreover, the aforementioned proposed schemes can be extensively applied to a case that control information is transmitted in a legacy PDSCH channel region, i.e., in an environment in which EPDCCH-based communication is performed as well as a case that the control information is transmitted in a legacy PDCCH channel region.

Figure 9:
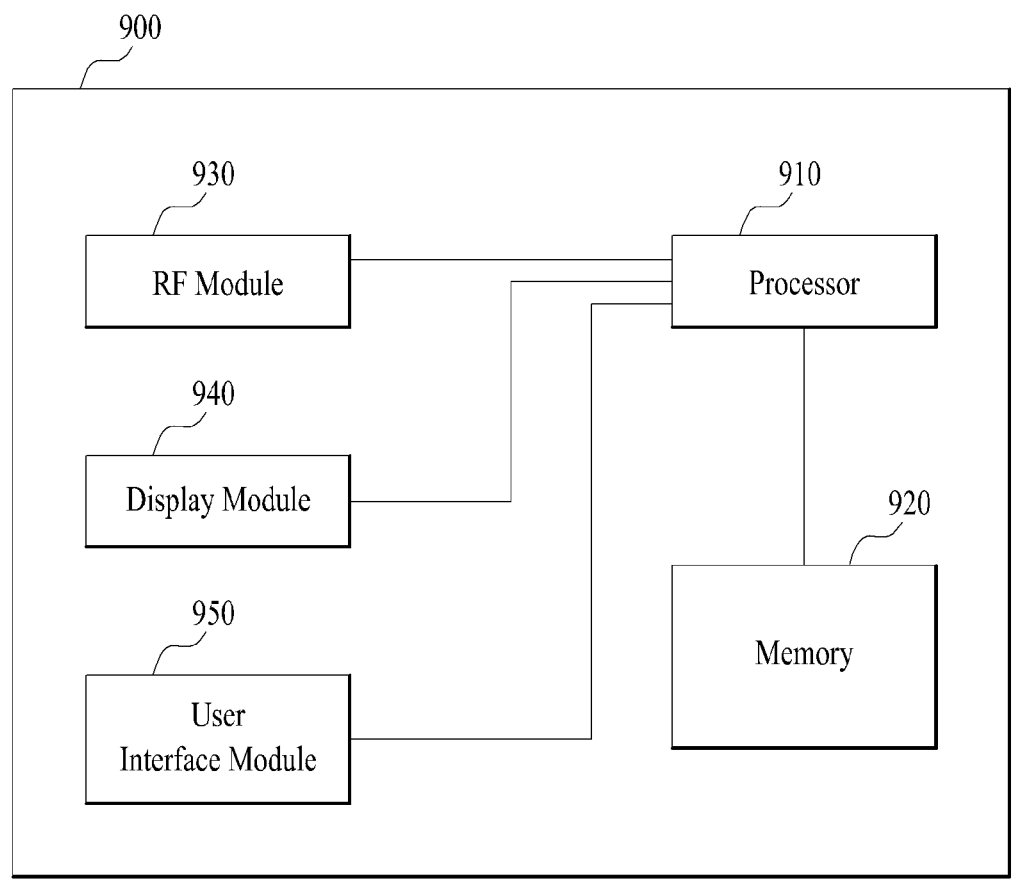
FIG. 9 is a block diagram for an example of a communication device according to one embodiment of the present invention.

FIG. 9 is a block diagram for an example of a communication device according to one embodiment of the present invention.

Referring to FIG. 9, a communication device 900 may include a processor 910, a memory 920, an RF module 930, a display module 940, and a user interface module 950.

Since the communication device 900 is depicted for clarity of description, prescribed module(s) may be omitted in part. The communication device 900 may further include necessary module(s). And, a prescribed module of the communication device 900 may be divided into subdivided modules. A processor 910 is configured to perform an operation according to the embodiments of the present invention illustrated with reference to drawings. In particular, the detailed operation of the processor 910 may refer to the former contents described with reference to FIG. 1 to FIG. 8.

The memory 920 is connected with the processor 910 and stores an operating system, applications, program codes, data, and the like. The RF module 930 is connected with the processor 910 and then performs a function of converting a baseband signal to a radio signal or a function of converting a radio signal to a baseband signal. To this end, the RF module 930 performs an analog conversion, amplification, a filtering, and a frequency up conversion, or performs processes inverse to the former processes. The display module 940 is connected with the processor 910 and displays various kinds of informations. And, the display module 940 can be implemented using such a well-known component as an LCD (liquid crystal display), an LED (light emitting diode), an OLED (organic light emitting diode) display and the like, by which the present invention may be non-limited. The user interface module 950 is connected with the processor 910 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of measuring link quality in a wireless communication system and an apparatus therefor are described with reference to examples applied to 3GPP LTE system, it may be applicable to various kinds of wireless communication systems as well as the 3GPP LTE system.

What is claimed is:

1. A method of receiving a signal by a user equipment in a wireless communication system, the method comprising:
receiving, from a serving cell, interference mitigation information to mitigate interference from a neighboring cell,
wherein the interference mitigation information includes MBSFN (Multimedia Broadcast Multicast Service Single Frequency Network) subframe configuration information; and
receiving a downlink signal from the serving cell by applying an interference mitigating scheme based on the interference mitigation information,
wherein the downlink signal is received without applying the interference mitigating scheme when the downlink signal is received at a MBSFN subframe indicated by the MBSFN subframe configuration information,
wherein the interference mitigating scheme is applied when the downlink signal is received at a non-MBSFN subframe indicated by the MBSFN subframe configuration information, and
wherein the applying the interference mitigating scheme includes:
receiving, from the serving cell, interfering cell CRS pattern information indicating CRS pattern of the neighboring cell to which a specific interference mitigation scheme is always applied; and
applying the specific interference mitigation scheme indicated by the interfering cell CRS pattern information to the downlink signal,
wherein the specific interference mitigation scheme is one of a transmitting rate-matching method, a receiving side puncturing method or a receiving side interference invalidating method.

2. The method of claim 1, further comprising receiving a fallback mode-based downlink signal from the serving cell after the interference mitigation information is received until the interference mitigation scheme is applied.

3. The method of claim 2, wherein the fallback mode-based downlink signal is received by an SFBC (space-frequency block coding)-based transmit diversity scheme.

4. The method of claim 1, wherein the interference mitigation information is received via an RRC (radio resource control) layer signal.

5. The method of claim 1, wherein the interference mitigation information comprises information on a cell-specific reference signal transmitted from the neighboring cell.

6. The method of claim 5, wherein the information on the cell-specific reference signal corresponds to information on the number of antenna ports for the cell-specific reference signal transmitted from the neighboring cell.

7. A method of transmitting a signal by a serving cell to a user equipment in a wireless communication system, the method comprising:
transmitting, to the user equipment, interference mitigation information to mitigate interference from a neighboring cell,
wherein the interference mitigation information includes MBSFN (Multimedia Broadcast Multicast Service Single Frequency Network) subframe configuration information; and
transmitting a downlink signal to the user equipment by applying an interference mitigating scheme based on the interference mitigation information,
wherein the downlink signal is transmitted without applying the interference mitigating scheme when the downlink signal is transmitted at a MBSFN subframe indicated by the MBSFN subframe configuration information,
wherein the interference mitigating scheme is applied when the downlink signal is transmitted at a non-MBSFN subframe indicated by the MBSFN subframe configuration information, and wherein the applying the interference mitigating scheme includes:

receiving, from the serving cell, interfering cell CRS pattern information indicating CRS pattern of the neighboring cell to which a specific interference mitigation scheme is always applied; and applying the specific interference mitigation scheme indicated by the interfering cell CRS pattern information to the downlink signal, wherein the specific interference mitigation scheme is one of a transmitting rate-matching method, a receiving side puncturing method or a receiving side interference invalidating method.

8. The method of claim 7, further comprising transmitting a fallback mode-based downlink signal to the user equipment after the interference mitigation information is transmitted until the user equipment receives a confirmation message for the application of the interference mitigation scheme.

9. The method of claim 8, wherein the fallback mode-based downlink signal is transmitted by an SFBC (space-frequency block coding)-based transmit diversity scheme.

10. The method of claim 7, wherein the interference mitigation information is transmitted via an RRC (radio resource control) layer signal.

11. The method of claim 7, wherein the interference mitigation information comprises information on a cell-specific reference signal transmitted from the neighboring cell.

12. The method of claim 11, wherein the information on the cell-specific reference signal corresponds to information on the number of antenna ports for the cell-specific reference signal transmitted from the neighboring cell.

* * * * *